United States Patent Office 3,352,696
Patented Nov. 14, 1967

3,352,696
METHOD OF MANUFACTURING PUNCTURE SEALING COMPOSITIONS
Temple E. Wallace, deceased, late of El Paso County, Tex., by Norma E. Wallace, executrix, 406 E. Baltimore Drive, El Paso County, Tex. 79902
No Drawing. Filed July 15, 1964, Ser. No. 383,558
1 Claim. (Cl. 106—33)

This invention relates to a composition for sealing punctures in pneumatic tires, and similar elastomeric articles carrying air under superatmospheric pressure. In one of its aspects, the invention relates to a novel composition which quickly and effectively seals punctures or holes which may occur in elastomeric materials carrying a gas under superatmospheric pressure. In another of its aspects, the present invention relates to the method or procedure by which such puncture sealing composition is manufactured.

A number of familiar situations exist in which an elastomeric article carrying a gas under pressure is punctured or ruptured so as to permit the gas to escape, thereby destroying the usefulness of the article. The most commonly known and widely used example of such articles is probably a pneumatic tire used on automobiles. In the past, a great variety of devices and compositions have been proposed and used for the purpose of sealing such punctures or ruptures of the elastomeric article containing the gas under pressure, and such devices and compositions have been used with varying degrees of success. Some of the compositions which have previously been proposed for use in pneumatic tires for sealing punctures which may be developed therein during usage of the tire perform very effectively, provided the puncture occurs within a relatively short time of the positioning of the composition in the tire. Frequently, however, such compositions lose their effectiveness in a relatively short period of time so that a puncture occurring at a later period is not sealed or effectively stopped by the composition. Such loss of effectiveness may result from evaporation of some of the active ingredients of the composition, chemical interaction between some of the components in the composition to destroy its effectiveness, or mere mechanical dissipation by plating out or coating upon the walls of the tire or inner tube after extended periods of usage. Other compositions which have been proposed undesirably ball up or form solid masses within the tire or inner tube so that at high speeds of operation of an automobile upon which the tires are mounted, the mass of sealing composition causes the tires in which it is located to become unbalanced.

Yet another disadvantage which has characterized some sealing compositions which are otherwise fairly effective has been the propensity of the sealing composition to congeal or solidify at low temperatures so that no puncture sealing effectiveness can be obtained during winter time operation of the automobile, or alternatively, have been destroyed or rendered ineffective at extremely high temperatures by chemical interaction or evaporation. In some instances, the viscosity of the sealing composition is reduced to such an extent during hot weather that the composition does not effectively block or seal the puncture but is simply pressed through the puncture by the pneumatic pressure within the tire.

Another disadvantage which is characteristic of some types of sealing compositions previously proposed is their limited scope of effectiveness from the standpoint of the types of punctures or breaks in the tire or inner tube which may occur. Thus, some of the puncture sealing compositions which rely primarily upon a gum base or very viscous material for sealing the puncture will effectively seal only very small breaks or punctures, and will not seal splits or relatively large cracks which may develop in the tire or inner tube. Other compositions which contain a bridging or mat forming material, such as asbestos or cellulose fibers, appear to provide effective closure of relatively large breaks in the tire or inner tube, but do not perform well in closing or sealing small punctures of the pin hole of nail size variety.

Among the previous efforts to develop an effective puncture or leak sealing composition for use in pneumatic tires are those which are described in United States Patent 2,357,650 to Loyd A. Hall and issued Sept. 5, 1944, and in United States Patent 961,144 issued to John H. Lewis on June 14, 1910. The Lewis composition represents a relatively early effort to provide a leak sealing composition which would perform satisfactorily in sealing punctures in pneumatic tires, but the composition proposed does not perform satisfactorily in contemporary pneumatic tires carrying air at a pressure of from 24 to 36 p.s.i.g. and predominantly employing tubeless tires and aluminum or steel rims. The Hall composition presented a considerable advance or improvement over the early composition of Lewis in that the patentee recognized the beneficial effect of including polyhydric alcohols in the composition, both as a plasticizer for the composition, and for the purpose of improving the anti-freezing properties of the composition to permit it to be used effectively during very cold weather.

The present invention provides an improved puncture sealing composition for use in pneumatic tires and similar apparatus in which a gas under pressure is confined in an elastomeric material. Since an important factor in the effectiveness of the composition in sealing punctures or holes against the escape of air or gas therethrough is the method of preparation of the composition, and since such method is believed to be novel, the invention also relates to the method or procedure by which the sealing composition is prepared.

Broadly described, the present invention contemplates a leak sealing composition comprising from about 39.6 weight percent to about 97 weight percent water; from 0 to about 53 weight percent of a polyhydric alcohol containing from two to three carbon atoms; from about 2.0 weight percent to about 4.25 weight percent asbestos fibers; from about 0.4 weight percent to about 1.5 weight percent of a rust inhibitor; from about 0.5 weight percent to about 1.5 weight percent of a mixture of natural gums, from about 0.4 weight percent to about 1.0 weight percent viscous cellulose ether materials; and from about 0.2 weight percent to about 0.5 weight percent of an alum compound.

The method of preparation of the puncture sealing composition of the invention comprises shredding the asbestos fibers to relatively small particle size, agitating them to separate them from each other and then sprinkling them in small increments over a period of time into the liquid comprising either substantially pure water, or water containing up to about 88 percent by weight of a polyhydric alcohol containing from 1 to 2 carbon atoms. About 270 parts of the water or water-ethylene glycol mixture are employed for each 10 to 20 parts by weight of asbestos fibers which are sifted into the water. Following the incremental and gradual sifting the abestos fibers into the polyhydric alcohol-water mixture, the mixture is thoroughly agitated for a minimum of about five minutes and the rust inhibitor compound or compounds are then added, and the mixture thoroughly agitated for a period of at least eight minutes.

When a relatively homogeneous mixture has been achieved, the natural gum materials are added to the mixture during the continued agitation thereof. The gums should be added slowly and the agitation continued after completion of the addition for a minimum period of about ten minutes. The viscous cellulosic materials are next added to the mixture in dry powdered form with the mixture being agitated following the addition for a minimum period of ten minutes. The mixture is then allowed to stand quiescently and the remaining water content of the mixture is added. The added water is brought to a temperature of from 110 to about 150° prior to the addition.

The alum which is incorporated in the mixture is initially made up as a clear white solution by dissolving the total amount of alum to be added to the sealing composition in the minimum amount of water required to achieve complete solution, and agitating the solution until a clear white solution appears. The clear white aqueous alum solution is then added to the warm mixture of the other sealing composition ingredients and the mixture agitated for a minimum of five minutes after completion of the alum addition.

It has been found that the described sequence of steps, with the exception of the sequence in which the rust inhibitor is added, is critical to the production of an effective sealing composition. Applicant cannot explain precisely all of the real or theoretical considerations which impart criticality to the steps and conditions prescribed, but tests have indicated that any substantial departure from the outlined procedure results in a substantially inferior composition which does not function nearly so effectively under all conditions as do the sealing compositions prepared in accordance with the outlined method.

In using the sealing composition of the invention, from about 10 to 20 ounces of the mixture is placed in the tire with the precise amount of composition utilized being dependent upon the size of the tire in which the composition is to be utilized, and to a lesser extent, upon the pneumatic pressure which the tire will carry.

Having generally described the invention, it will now be appreciated by the reader that it is a major object of the present invention to provide an improved puncture sealing composition which may be used for effectively sealing or healing punctures, ruptures, splits and openings which may deleteriously occur in elastomeric articles carrying a gas under pressure.

An additional object of the present invention is to provide a sealing composition for sealing punctures in pneumatic tires under widely varying conditions of use of the tires, or of operation of an automobile or vehicle carrying such tires.

Another object of the present invention is to provide a puncture sealing composition adapted for use in pneumatic tires mounted on metallic rims, which composition does not corrode or deleteriously attack the metallic rims.

An additional object of the present invention is to provide a puncture sealing composition for use in pneumatic tires, which composition functions effectively over a wide range of temperatures extending from about −20° F. to about 175° F.

Another object of the present invention is to provide a composition for sealing punctures in pneumatic tires, which composition does not ball up or solidify within the tire over extended periods of time, and which does not concentrate in a particular location within the tire during operation of the vhicle carrying the tire so as to cause unbalancing of the wheels of the vehicle.

Yet another object of the present invention is to provide a novel and highly useful method for preparing a sealing composition useful in sealing punctures in elastomeric articles carrying a gas under superatmospheric pressure.

An additional object of the present invention is to provide a puncture sealing composition which does not deleteriously affect the tensile strength or other mechanical properties of rubber with which such composition may be in contact during its use.

In addition to the foregoing described objects and advantages of the invention, other objects and advantages will become apparent as the following detailed description of the invention is read.

First, the nature and importance of the several ingredients used in the puncture sealing composition of the present invention will be considered. Though it is preferable to employ a polyhydric alcohol-water mixture in the composition, water alone may be employed as the primary liquid phase under conditions of use where the composition need only remain effective for a relatively short period of time, and where the range of temperature over which the composition will be used will not vary widely from normal or ambient temperatures. The inclusion of the polyhydric alcohol in the proportions indicated imparts several valuable properties to the sealing composition and its inclusion is therefore much to be preferred. Of course, one of the main characteristics imparted to the puncture sealing composition by the polyhydric alcohol is the depression of the freezing point or congealing point of the composition so that it will remain fluent at low temperatures. The polyhydric alcohol also prevents evaporation and maintains stability of the composition at high temperatures. Additionally, the polyhydric alcohol acts as a plasticizer for the composition, and its relatively high viscosity assists in bringing the final composition to an optimum state of viscosity so that it is not dispersed freely over the entire surface of the tire or other article on which it is used, but is concentrated over the portion of the tire in contact with the ground and most likely to be punctured. The polyhydric alcohol also improves the elastic properties of the product.

The types of polyhydric alcohols which may be utilized are those containing from 2 to 3 carbon atoms and typically include glycerol, ethylene glycol and propylene glycol. The most preferred alcohol is ethylene glycol, and the polyhydric alcohol is utilized, as previously indicated, in an amount of from about 0 to 53 weight percent of the total weight of the final composition. Preferably, the amount of alcohol employed is from about 18 to about 53 weight percent of the composition, or from about 20 to about 54 weight percent of the total water and alcohol content. The total pure water or water-alcohol content of the composition should be from about 92 to about 97 weight percent.

The way in which the alcohol and water are incorporated in the composition, and their relative proportions during such incorporation merits further discussion in the interest of clarification. In the description of the novel, preferred method of preparing the composition as hereinafter described it will be noted that the water or water alcohol solution is added at two different points in the procedure—that is, initially, to constittue the liquid base for receiving the dry ingredients of the composition, and then at a later stage following the addition of the cellulose ethers to the composition and just prior to the addition of alum. Varying proportions or ratios of alcohol to water can be added at each of these times, or pure water can be added at both times, with the controlling considerations being only that (a) from about 92 to about 97 weight percent (based on weight of finished composition) of water or water-alcohol solution be added cumulatively by both additions, and that the total amount of alcohol incorporated not exceed about 53 weight percent of the entire final composition. The total amount of water and alcohol, or pure water, used as the liquid base at the outset is preferably from about 59.6 to about 60.7 weight percent of the final composition weight, and of this amount as much as 89 weight percent can be alcohol. The remaining 31.3 to 39.4 weight percent of water-alcohol solution, or pure water (based on the weight of the composition) is added in the second step. It is preferred that where both water and alcohol are added as a common solution in the second step the amount of alcohol therein not exceed 60 weight percent of such solution.

The employment of asbestos fibers in the composition of the present invention is important to the proper functioning of the composition since the asbestos increases the strength and toughness of the seal which the composition forms in the puncture opening, and the asbestos fibers have a surface area per unit of weight which is ten times as great as that of organic and inorganic fibers of animal and plant origin. Thus the openings in the mat formed by the asbestos fibers as the sealing composition plugs the puncture or rupture in the tire are much smaller, and can be much more easily bridged and stopped by the other components of the composition. Another important reason for employing asbestos fibers in the composition of the invention is their relatively small diametric size, fibers having a diameter as small as $7 \times 10^{-7}$ inch being available and suitable. The fibers are particularly well-suited also because of their well-known heat resistance, and the fact that they do not rot over extended periods of usage and are not attacked by most chemicals or by water.

While it is preferable to use chrysotile asbestos fibers in the composition of the invention, amphibole asbestos can also be used. The grade of the fibers employed is preferably 4-K, with such designation being in accordance with the size designations used in the Canadian asbestos industry.

The fibers should be well shredded and separated prior to addition to the mixture and should be added, as previously indicated, over a relatively extended period of time. The amount of the fibers which is incorporated in the mixture may vary from about 2 to about 4.25 weight percent of the composition, with the amount added in any given situation depending upon the amount of ballast or bulk which is desired in the final composition. For pneumatic tires which are rotated at a particularly high speed, such as those employed on aircraft, it is preferable to use relatively larger amounts of the fibers. It is also preferred to use an amount of asbestos fibers in the upper portion of the prescribed range in situations where the pneumatic pressure acting through punctures which may be developed is expected to be unusually high, i.e., in excess of 40 p.s.i.g.

The rust inhibitor compounds used in the composition function to prevent corrosion or chemical attack on the metal rims or other metal surfaces with which the composition may come in contact. Substantially any conventional rust inhibiting agent or compound may be utilized, provided it is compatible with the other components of the composition and does not enter into any chemical interaction with such components. Materials which are suitable for use in the composition include, but are not limited to, alkali metal bichromates, triethanolamine and phosphoric acid, and alkali metal nitrites. The preferred material for use as a rust inhibitor in the invention is either an alkali metal bichromate, or a mixture comprising about 32 weight percent of phosphoric acid and 68 weight percent triethanolamine. The alkali metal bichromates are particularly well-suited, and are most preferred, for use as the rust inhibitor compounds used in the composition of the invention because of the additional beneficial property which they possess as heat resisting agents. Thus, they are particularly preferred for use in the composition as the rust inhibiting component thereof where it is anticipated that the puncture sealing composition will be used in a high temperature environment, such as for desert driving or the like.

It should further be noted that the proportions of polyhydric alcohol and water utilized in the sealing composition of the invention are such that most types of antifreeze now commercially available for use in automobiles can be used to provide a mixture of polyhydric alcohol and water which is suitable for use in the sealing composition of this invention. Where such commercially available antifreezes are employed, it will usually be unnecessary to use more than a slight amount of rust inhibitor in the composition, and it is anticipated that amounts in the lower portion of the prescribed range of from about 0.4 to about 1.5 weight percent can be employed under these circumstances.

The natural gums which are used in the present invention are of considerable importance. Although certain synthetic dextrins have recently been developed which have been thought to be effective substitutes for, and substantial equivalents to, the natural gums in certain types of adhesive and other compositions, it has been found that it is important in achieving the optimum sealing properties characteristic of the composition of this invention to use natural gums, and it is highly preferred to use certain specific natural gums in certain proportions. Thus, it is preferred to use a mixture comprising about 50 weight percent of gum arabic and about 50 weight percent of gum karaya as the natural gum component of the composition.

The gum arabic, which is also sometimes termed gum acacia, is soluble in cold water and its adhesive properties are well-known. Moreover, the gum arabic undergoes a substantial increase in its adhesive strength when used in conjunction with alum, a component of the present composition which is hereinafter discussed. Another useful characteristic of the gum arabic is that it is softened and made more flexible or pliable by contact with the polyhydric alcohol. The presence of the polyhydric alcohol and a heat resisting agent, such as alkali metal bichromate rust inhibiting compounds, permits the gum arabic to function well and remain stable at higher temperatures than it is normally able to withstand. Thus, temperatures at least as high as 175° F. can be withstood by the composition without any detrimental decomposition or breakdown of the gum arabic component thereof with resulting reduction in the adhesive strength of the composition.

The gum karaya component of the composition is in important complement to the gum arabic which is utilized. The gum karaya, which is also sometimes termed sterculia gum, is used to increase the viscosity of the composition although it has no pronounced adhesive quality. It also congeals in the composition to provide a stringy continuity to the entire composition, and thus assists in the bridging or blocking effect attributable to the asbestos fibers. Because of this propensity to increase the viscosity and to provide a stringy effect to the composition, the gum karaya is preferred to other natural gums, such as gum tragacanth, which does not congeal to string-like form in the composition.

In adding the preferred mixture of gum arabic and gum karaya to the composition, these materials are comminuted to a relatively fine powder or to granules, mixed dry, and are sifted into the composition while it is agitated. Because of the propensity of the gum arabic to break down and decompose at higher temperatures, the addition should be made while the temperature of the liquid base to which it is added does not exceed about 100° F. in the case of a pure water base, and about 120° F. in the case of a polyhydric alcohol containing base. From about 0.25 to about 0.75 weight percent of each of the gums is used in the composition, with from about 0.5 to about 0.7 weight percent of each being preferred.

As the cellulosic components of the composition, various types of cellulosic ethers may be included, but it has been found that superior results are achieved when a mixture of an alkali metal salt of carboxymethyl cellulose is used in combination with methyl cellulose. The carboxymethyl cellulose salt constitutes a water soluble, cellulose ether gum which aids in emulsifying the entire composition, and imparts additional adhesive properties to the composition. It also functions as an humectant which prevents evaporation of the water content of the composition, and it is a particularly important ingredient when the polyhydric alcohol is omitted from the composition. Because of its greater thickening power than pure methyl cellulose, it is preferred to use approximately equal quantities of the carboxymethyl cellulose salt with the pure methyl cellulose, which compound is a water soluble, non-toxic cellulosic ether which is commercially supplied in the form of white fibers. The type of methyl cellulose employed is preferably a methyl cellulose which yields a 2 percent aqueous solution having a viscosity of 4000 centipoises at 20° C. The methyl cellulose component is unaffected by oily and greasy materials of animal, vegetable and mineral origin, and is stable to heat without distortion up to 225° C. and is also stable to light. Thus, the methyl cellulose greatly enhances the heat stability of the composition, and further assists in maintaining an optimum viscosity in the composition over wide ranges of temperature.

As previously indicated, the carboxymethyl cellulose salt and the methyl cellulose are preferably used in approximately equal quantities, constituting in each case from about 0.2 to about 0.5 weight percent of the composition.

The methyl cellulose is commercially available and is marketed under the trademark Methocel by the Dow Chemical Corporation of Midland, Mich. The alkali metal salt of carboxymethyl cellulose is marketed under the tradename CMC by the Hercules Powder Company of Wilmington, Del.

The final component added to the composition is alum. The alum is incorporated in the mixture as a clear white aqueous solution made by dissolving the total amount of alum to be added to the composition in a minimum amount of warm water which will dissolve the alum. Either ammonium, potassium, chromium or sodium alum may be employed, with the potassium alum being preferred. As will be recognized by those skilled in the art, the term alum refers to ammonium, chromium or alkali metal aluminum sulphate salts having twelve waters of hydration incorporated in the molecule. The amount of alum employed is from about 0.2 to about 0.5 weight percent of the composition, with an amount of from about 0.2 to about 0.4 weight percent being preferred.

As has been hereinbefore indicated, the procedure or method by which the composition of the present invention is manufactured is believed to be novel, and its sequence of steps and conditions should be fairly closely adhered to in order to obtain a product which functions in an optimum manner. It is preferable to add the shredded asbestos fibers in separated form and in increments at a point early in the blending or combination of the several components so that the fibers will remain thoroughly dispersed in the mixture as the addition of the other components proceeds. Most preferably, the asbestos is the first component added to the water, or water-alcohol, base. Following the addition of the asbestos fibers, the mixture of the fibers with the water or water-alcohol base should be thoroughly agitated for a minimum of five minutes, and preferably for a period of about fifteen minutes.

In the next step of the procedure, the rust inhibitor is added to the composition, and the mixture then again agitated for a period in excess of eight minutes, and preferably for about fifteen minutes. (Of course, where the polyhydric alcohol is supplied in the form of a commercially available antifreeze, some rust inhibitor will already be present.) Following such agitation, the inert natural gums are added to the composition by sprinkling or sifting them slowly into the composition while continuously agitating the mixture. Preferably, the gum karaya and gum arabic which constitute the preferred natural gum ingredients added to the composition are first blended in equal proportions in dry form to make up the total gum content of the composition, and the dry mixture is then sprinkled into the mixture. Following the addition of the gum ingredients to the composition, agitation of the composition is continued for a period exceeding ten minutes, and preferably, for about twenty minutes. It is important that the gum components of the composition be added to the mixture while the mixture is at a temperature of less than about 120° F. and preferably less than 100° F. Slightly higher temperatures may be used where a substantial portion of polyhydric alcohol is present in the base.

Prior to their addition to the composition and following the addition of the gum components thereto, the carboxymethyl cellulose salt and the methyl cellulose are blended together in dry form and in approximately equal parts by weight, and the blend is then added slowly to the mixture while continuing the agitation. Upon completion of the addition, agitation is continued for a period of at least ten minutes and preferably for about twenty-five minutes. It is important that the cellulosic components of the composition be added after the natural gum ingredients, and prior to the addition of warm or hot water as hereinafter described, since the interaction between the gums and the cellulosic material is detrimental if the cellulosic material is incorporated in the mixture prior to the addition of the natural gums hereto. (The viscous cellulosic materials further serve to protect the gums against the higher temperatures which may be developed in the use of the composition, and also permit warm water to be added later in the preparation as hereinafter described.)

Following the addition of the carboxymethyl cellulose salt and the methyl cellulose ether, the mixture is agitated for a period exceeding ten minutes, and preferably for about twenty-five minutes. The mixture is then permitted to become quiescent, and water at a temperature of from about 110 to about 150°, and in an amount comprising from about 31.3 to about 37.4 weight percent of the final composition is added to the mixture. Alternatively a water-polyhydric alcohol mixture containing up to about 60 weight percent (based on the total weight of the mixture) of the alcohol may be added. The amount of such mixture, when used, should also be equivalent to from about 31.3 to about 37.4 weight percent of the total composition and should not bring the total alcohol content of the composition to in excess of 53 weight percent thereof. Preferably, the temperature of the water, or water-alcohol mixture, added at this stage of the process is about 140° F.

As a final step of the process, the alum solution made up as previously described is added to the mixture and the mixture is then agitated for a minimum period of about five minutes and preferably for a period of about thirty minutes. The resulting compositon should be a homogeneous mixture. It is important that the alum be added as the final step in the process in order that it may prevent bulking and gumming of the ingredients previously added, and assist in homogenizing the entire mixture.

In utilizing the composition of the invention, from about 10 to about 20 ounces of the mixture is forced into the tire through the air valve thereof after the stem of the valve has been removed. The stem is then reinserted and the tire reinflated to its desired pressure. The composition is characterized in having a long and effective service life, and does not become dissipated or lost through evaporation for periods of as long as one year. The precise amount of material which is injected will depend in each case on the size of the tire, and to some extent, the pressure of the air within the tire.

The following examples will further demonstrate and exemplify the practice of the present invention, and will also make evident the non-corrosive effect of the composition, and its function in enhancing the tensile strength of various types of rubbers with which it is in contact.

*Example I*

17 gallons of ethylene glycol and 12 gallons of water at about 70° F. were added to a 55-gallon mixing container. The ethylene glycol contained about 3.5 pounds of a rust inhibiting solution comprising 68 weight percent triethanolamine and 32 weight percent phosphoric acid. The volume of liquid in the container was then brought up to about 33 gallons by the addition of about 4 gallons of water heated to about 140° F. This mixture was then equivalent to about 141 pounds of the alcohol and 121 pounds of the water.

To the alcohol-water mixture was added 15.7 pounds of Grade 4-K chrysotile asbestos fibers. The fibers were initially manually disentangled and then were sprinkled gradually into the alcohol-water mixture with continued agitation of the mixture. After completion of the addition of the asbestos fibers, agitation was continued for fifteen minutes.

3 pounds of dry, pulverized gum arabic was next thoroughly mixed with 3 pounds of dry, pulverized gum karaya and the dry mixture gradually sprinkled into the alcohol-water asbestos-containing base mixture during agitation. The agitation was continued for a period of about twenty minutes after completion of the addition.

2.3 pounds of sodium carboxymethyl cellulose (Hercules Powder Company—CMC) and 2.3 pounds of methyl cellulose fibers (of a type yielding a 2 percent aqueous solution having a viscosity of 4000 centipoises at 20° C.) were blended together in dry form and the mixture added gradually to the mixing container while agitating the mixture. Agitation was continued for a period of about twenty-five minutes following the addition.

The mixture was permitted to become quiescent and then 11.4 gallons of ethylene glycol containing 2.5 pounds of rust inhibitor solution (68 weight percent triethanolamine and 32 weight percent phosphoric acid) and 9.8 gallons of water were added as a single solution which had been preheated to a temperature of 140° F. immediately prior to the addition. This volume of alcohol and water was equivalent to about 94 pounds of the alcohol and about 79.5 pounds of the water.

A clear, white saturated aqueous solution of potassium aluminum sulphate (alum) containing 1 pound of the sulphate was then added to the mixture and the final composition agitated for about thirty minutes until homogeneity was achieved.

*Example II*

In undertaking to determine the criticality of the amount of water, or water and glycol, used in the composition, a number of compositions were made up in substantially the same manner as that described in Example I. It was determined that when the total water or water-glycol content of the composition exceeds 97 weight percent, or is lower than about 92 weight percent, the sealing quantities of the product are lost.

*Example III*

Nails were driven into tubeless pneumatic tires into which about 14 ounces of the composition prepared in Example I had been injected. Quick evaluations were also made using an icepick to puncture the tires. The sealing composition sealed the punctures at temperatures as low as −40° F., and at room temperatures the punctures were sealed within several seconds after the nails and icepick were removed from the tires.

*Example IV*

In order to evaluate the effect of the puncture sealing composition upon the tensile strength of rubber of the type used to fabricate pneumatic tires, test specimens cut from tubeless tires of various leading manufacturers were soaked in the composition for six days at 130° F. and then tested for tensile strength. Results of these tests are set forth in Table I.

TABLE I

| Tire Manufacturer | Original Tensile Strength, p.s.i. | Tensile Strength Average of Three Specimens After Aging, p.s.i. |
| --- | --- | --- |
| A | 1,675 | 1,795 |
| B | 1,660 | 1,690 |
| C | 2,085 | 2,310 |
| D | 1,565 | 1,710 |

From the results set forth in Table I, it will be apparent that some improvement in the tensile strength of test specimens was derived from contact with the sealing composition.

*Example V*

Steel and aluminum corrosion tests of the composition were conducted by immersing metal test strips in the composition for twelve days at 130° F. No evidence of corrosion of either the steel or aluminum test strips was apparent on completion of the tests. Also, in actual puncture sealing tests, no corrosion of the rims upon which the tires were mounted was noted.

From the foregoing description of the invention, it will have become apparent that a novel and highly effective puncture sealing composition has been proposed which is relatively simple and inexpensive to prepare. The composition functions well over a wide temperature range, and maintains its sealing efficiency for long periods of time. No corrosion of metal parts with which it is in contact occurs, and it affords some improvement to the tensile strength of the rubber with which it is in contact.

Although certain procedures and proportions of materials have been hereinbefore described in order to provide an example of the invention sufficient to permit one skilled in the art to practice the invention when so authorized, it is to be understood that these exemplary ranges, proportions, and preparation conditions are not intended as stringently limiting with respect to the scope of the invention. Insofar, therefore, as modifications and changes may be made in the particular components herein identified, and in the ranges and proportions in which they are used, and also in the conditions of time, temperature and sequence under which they are blended in producing the composition, all such changes and modifications are deemed to be circumscribed by the spirit and scope of the invention except as the same may be necessarily limited by the appended claim or reasonable equivalents thereof, or may have been indicated to be critical in the foregoing specification.

What is claimed is:

The method of manufacturing a composition for sealing punctures in elastomeric articles comprising
    adding from about 2 to about 4.25 parts by weight asbestos fibers to from about 59.6 to about 60.7 parts by weight of an aqueous solution comprising from 0 to about 89 weight percent of a polyhydric alcohol containing from 2 to 3 carbon atoms, the balance consisting essentially of water;
    agitating the asbestos containing mixture for at least five minutes;
    adding to the mixture from about .4 to about 1.5 parts by weight of a rust inhibiting composition selected from the group consisting of alkali metal bichromates, alkali metal nitrates, and a mixture of triethanolamine and phosphoric acid;
    agitating the mixture for a period of at least eight minutes;
    adding to the mixture from about 0.5 to about 1.5 parts by weight dry blend of natural gums comprising about 50 weight percent of gum arabic and about 50 weight percent of gum karaya;
    agitating the mixture for a period of at least ten minutes;
    mixing together in dry form, from about 0.2 to about 0.5 part by weight of an alkali metal carboxymethyl cellulose salt with from about 0.2 to about 0.5 part by weight of methyl cellulose; then adding the dry blend of the cellulose ether compounds to said mixture;

agitating the mixture for at least ten minutes;

permitting the mixture to become quiescent;

adding to said mixture from about 31.3 to about 37.4 parts by weight of an aqueous solution comprising from 0 to about 60 weight percent of a polyhydric alcohol of 1 to 2 carbon atoms, the balance consisting essentially of water, said aqueous solution being added to said mixture at a temperature of said solution of from about 110° F. to about 150° F., and in an amount such that the total weight of both alcohol and water in the final composition is from about 92 to about 97 weight percent of the final composition, and such that the total weight of alcohol in said composition does not exceed 53 weight percent of the composition;

adding from about 0.2 to about 0.5 part by weight of alum to said mixture; and agitating said mixture for at least five minutes.

References Cited

UNITED STATES PATENTS

| | | | |
|---|---|---|---|
| 961,144 | 6/1910 | Lewis | 106—33 |
| 2,241,963 | 5/1941 | Rosenthal | 106—33 |
| 2,357,650 | 9/1944 | Hall | 106—33 XR |
| 2,988,455 | 6/1961 | Rosenberg et al. | 106—197 XR |

ALEXANDER H. BRODMERKEL, *Primary Examiner.*

L. B. HAYES, *Assistant Examiner.*